(12) United States Patent
Maruyama et al.

(10) Patent No.: US 11,065,957 B2
(45) Date of Patent: Jul. 20, 2021

(54) DRIVE POWER CONNECTING/DISCONNECTING DEVICE

(71) Applicant: AISIN SEIKI KABUSHIKI KAISHA, Kariya (JP)

(72) Inventors: Taketoki Maruyama, Toyoake (JP); Isao Kato, Toyoake (JP); Atsushi Kajikawa, Hekinan (JP); Munenori Ota, Toyota (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 302 days.

(21) Appl. No.: 16/303,725

(22) PCT Filed: Mar. 29, 2017

(86) PCT No.: PCT/JP2017/013111
§ 371 (c)(1),
(2) Date: Nov. 21, 2018

(87) PCT Pub. No.: WO2017/203831
PCT Pub. Date: Nov. 30, 2017

(65) Prior Publication Data
US 2020/0391590 A1    Dec. 17, 2020

(30) Foreign Application Priority Data
May 25, 2016    (JP) .............. JP2016-104259

(51) Int. Cl.
*B60K 23/08*    (2006.01)
*F16D 27/108*    (2006.01)
(Continued)

(52) U.S. Cl.
CPC ............ *B60K 23/08* (2013.01); *F16D 27/108* (2013.01); *F16D 27/118* (2013.01); *F16H 48/08* (2013.01)

(58) Field of Classification Search
CPC ...... B60K 23/08; F16D 27/108; F16D 27/118
(Continued)

(56) References Cited

U.S. PATENT DOCUMENTS 4,545,456 A    10/1985    Lake
4,561,520 A *  12/1985    Fogelberg ............... F16D 27/10
                                                                    180/247

(Continued)

FOREIGN PATENT DOCUMENTS

FR    2 679 303 A1    1/1993
JP    S59-054221 U    4/1984
(Continued)

OTHER PUBLICATIONS

Official Action dated Aug. 19, 2020, by the U.S. Patent & Trademark Office in U.S. Appl. No. 16/086,096. (13 pages).

(Continued)

*Primary Examiner* — Charles A Fox
*Assistant Examiner* — Tracey E. Bell
(74) *Attorney, Agent, or Firm* — Buchanan Ingersoll & Rooney PC (57) ABSTRACT

The drive power connecting/disconnecting device includes a second shaft disposed coaxially to a first shaft so as to transmit drive power to a wheel axle, a connection/disconnection member which moves a second rotational body along an axial direction with respect to a first rotational body, and which is capable of moving in the axial direction so as to make or break engagement between the first shaft and the second shaft, a supporting member, a shaft cover which covers at least the periphery of the second rotational body, a first pivotally supporting portion which is disposed between the first shaft and the second shaft so as to axially support one end of the second shaft; and a second pivotally (Continued)

supporting portion which is disposed inside the shaft cover so as to axially support the other end of the second shaft.

10 Claims, 6 Drawing Sheets

(51) Int. Cl.
*F16D 27/118* (2006.01)
*F16H 48/08* (2006.01)

(58) Field of Classification Search
USPC .......................................................... 475/150
See application file for complete search history.

(56) References Cited

U.S. PATENT DOCUMENTS

| | | | |
|---|---|---|---|
| 5,386,898 | A | 2/1995 | Weilant et al. |
| 5,605,213 | A | 2/1997 | White |
| 7,654,376 | B2 | 2/2010 | Liu |
| 9,005,069 | B2 | 4/2015 | Fusegi et al. |
| 9,200,684 | B2 | 12/2015 | Fujii et al. |
| 9,422,988 | B2 | 8/2016 | Beesley et al. |
| 9,493,230 | B2 * | 11/2016 | Balsiger .............. F16H 55/0833 |
| 9,546,696 | B2 * | 1/2017 | Oram ..................... F16D 11/14 |
| 9,878,615 | B2 * | 1/2018 | Kamitani ................ F16H 48/40 |
| 10,233,977 | B2 * | 3/2019 | Mayr ................. B60K 17/3462 |
| 10,323,699 | B2 | 6/2019 | Beesley et al. |
| 10,596,901 | B2 * | 3/2020 | Yoshisaka ............. F16D 27/108 |
| 2011/0108352 | A1 | 5/2011 | Haggerty |
| 2012/0238388 | A1 | 9/2012 | Fusegi et al. |
| 2015/0068862 | A1 | 3/2015 | Fujii et al. |
| 2015/0167751 | A1 * | 6/2015 | Saieg .................... F16D 27/118 |
| | | | 192/69.8 |
| 2016/0053829 | A1 * | 2/2016 | Mogi .................... F16D 27/112 |
| | | | 192/84.9 |
| 2016/0153506 | A1 | 6/2016 | Beesley et al. |

FOREIGN PATENT DOCUMENTS

| | | |
|---|---|---|
| JP | S62-025361 U | 2/1987 |
| JP | 2003-278800 A | 10/2003 |
| JP | 2008202671 A | 9/2008 |
| JP | 2008-302809 A | 12/2008 |
| JP | 2012193780 A | 10/2012 |
| JP | 2015155750 A | 8/2015 |
| WO | 2016/018203 A1 | 2/2016 |

OTHER PUBLICATIONS http://www.awdwiki.com/images/toyota-add-front-axle-disconnect.jpg, publication date unknown though prior to Nov. 21, 2018, 1 page.

International Search Report (PCT/ISA/210) dated Jul. 4, 2017, by the Japanese Patent Office as the International Searching Authority for International Application No. PCT/JP2017/013111.

Written Opinion (PCT/ISA/237) dated Jul. 4, 2017, by the Japanese Patent Office as the International Searching Authority for International Application No. PCT/JP2017/013111.

Office Action (Notice of Reasons for Refusal) dated May 26, 2020, by the Japanese Patent Office in corresponding Japanese Patent Application No. 2018-508460 and an English Translation of the Office Action. (7 pages).

Office Action (Notice of Reasons for Refusal) dated Mar. 24, 2020, by the Japanese Patent Office in corresponding Japanese Patent Application No. 2016-104259 and an English Translation of the Office Action. (8 pages).

\* cited by examiner

NON-CONNECTED STATE

Fig. 5

CONNECTED STATE

Fig. 6

DRIVE POWER CONNECTING/DISCONNECTING DEVICE

TECHNICAL FIELD OF INVENTION

This invention relates to a drive power connecting/disconnecting device for connecting or disconnecting a power transmission from a power source.

BACKGROUND TECHNOLOGY OF INVENTION

Conventionally, as an example, a drive power connecting/disconnecting device has been known which, after a transmission of a drive power from a transfer mechanism to a front differential mechanism, connects or disconnects the transmission of the drive power which is distributed to right and left front wheel axles by the front differential mechanism. (See Patent Literature 1).

Such drive power connecting/disconnecting device is provided with a first shaft configured to be connected to the front differential mechanism, a clutch ring which is axially slidably provided on the first shaft and formed with dog teeth thereon, a clutch shaft provided coaxially with the first shaft and relatively rotatable thereto and formed with dog teeth at one end to be engaged with the dog teeth of the clutch ring and an intermediate shaft connected to the other end of the clutch shaft and extending in a wheel axle direction. In other words, the drive power connecting/disconnecting device performs connecting/disconnecting of the drive power by a dog clutch formed by the clutch ring and the clutch shaft.

Further, the drive power connecting/disconnecting device is provided with a device which makes the clutch ring slide in an axial direction. As such device, a stationary element in which a coil is housed and which is provided at the outer periphery of the first shaft coaxially therewith, a magnetic force acting portion (movable element) provided facing to the stationary element in an inner diameter direction and coaxially therewith, a non-magnetic linkage acting portion slidable with the magnetic force acting portion in an axial direction as a unit therewith and a biasing member which biases the clutch ring in a releasing direction upon de-energization of the coil are provided.

Further, according to the drive power connecting/disconnecting device, the front differential mechanism, the first shaft, the clutch ring, the stationary element, the magnetic force acting portion and the linkage acting portion are housed in a differential housing and the position of the stationary element in both axial and radial directions is restricted by the differential housing. The linkage acting portion is supported on the first shaft and prevents the magnetic flux generated by the current energization to the coil from leaking towards the first shaft. The biasing member is disposed between the clutch ring and the clutch shaft and biases the clutch ring and the clutch shaft in a direction where the clutch ring and the clutch shaft separate from each other. The clutch shaft is supported on the clutch housing one end of which is connected to the differential housing and extends inside of a shaft cover to which the other end of the clutch housing is connected. Thus, the clutch shaft is configured to be connected to the intermediate shaft.

According to the drive power connecting/disconnecting device explained above, when a driving mode is changed to a four-wheel drive mode by a driver's operation or according to a vehicle running condition, the coil is energized and due to a generation of a magnetic flux the magnetic force acting portion and the linkage acting portion as a plunger function slidably move the clutch ring in the clutch shaft direction against a biasing force of the biasing member to establish an engagement between the clutch ring and the clutch shaft. Thus, the drive power is transmitted to the front right and left wheels. On the other hand, when the driving mode is shifted to a two-wheel drive mode, the coil is de-energized and the clutch ring slidably moves in a releasing direction by the biasing force of the biasing member to disengage the engagement between the clutch ring and the clutch shaft. Thus, the drive power is not transmitted to the front right and left wheels.

DOCUMENT LIST OF RELATED ART

Patent Literature

Patent Literature 1: JP2012-193780 A

SUMMARY OF INVENTION

Problems to be Solved by Invention

However, according to the conventional drive power connecting/disconnecting device, since the drive power connecting/disconnecting device is housed in the differential housing, it is necessary to provide a differential housing exclusively used for accommodating the drive power connecting/disconnecting device. Accordingly, it becomes difficult to commonly use the components of the differential housing of the type without drive power connecting/disconnecting device. Further, according to the conventional device, since the device is configured to the structure that the differential housing and the shaft cover are connected through the clutch housing and further the first shaft and the intermediate shaft are connected through the clutch shaft, the number of components increases.

The present invention was made in consideration with the above problems and the objective of the invention is to provide a drive power connecting/disconnecting device, the number of components thereof can be reduced without changing the shape of the differential housing.

Means to Solve the Problem(S)

In order to solve the above conventional problems, the connecting/disconnecting device according to the invention includes a differential housing which accommodates therein a differential mechanism, a first shaft supported on a boss portion of the differential mechanism and rotating a first rotational body which transmits a drive power distributed at the differential mechanism, a second shaft provided coaxially with the first shaft and transmitting the drive power to a wheel axle transmitted from the first rotational body by a second rotational body which is positioned opposing to the first rotational body, a connecting/disconnecting member provided axially movably on an outer periphery of the second shaft and moving the second rotational body in the axial direction relative to the first rotational body to thereby connect or disconnect the first shaft and the second shaft, a supporting member provided on an outer periphery of the second shaft and supporting the connecting/disconnecting member to be movable along in the axial direction, a stationary element provided on an outer periphery of the second shaft and moving the connecting/disconnecting member along in the axial direction by energization of a coil, a shaft cover covering at least an outer periphery of the second rotational body and connected to the differential housing, a first pivotally supporting portion provided between the first shaft and the second shaft and pivotally supporting one end of the second shaft and a second pivotally supporting portion provided inside of the shaft cover and pivotally supporting another end of the second shaft.

Effect of Invention

According to the feature above, the first shaft is supported on the boss portion of the differential mechanism, the first pivotally supporting portion is provided between the first shaft and the second shaft to pivotally support one end of the second shaft and the other end of the second shaft is pivotally supported by the second pivotally supporting portion provided inside of the shaft cover. Since the stationary element, the connecting/disconnecting member and the supporting member are provided on the outer periphery of the second shaft, the first rotational body, the second rotational body, the second shaft, the connecting/disconnecting member, the supporting member and the stationary element can be accommodated in the shaft cover. In other words, by placing the drive power connecting/disconnecting device in the shaft cover, the shape of the differential housing is not necessarily changed depending on the type with or without drive power connecting/disconnecting device. Further, the clutch shaft and the clutch housing which covers the clutch shaft necessary for the conventional drive power connecting/disconnecting device are no more necessary and the structure of the drive power connecting/disconnecting device which number of components is reduced, can be realized.

THE EMBODIMENTS FOR IMPLEMENTING THE INVENTION

Figure 1:
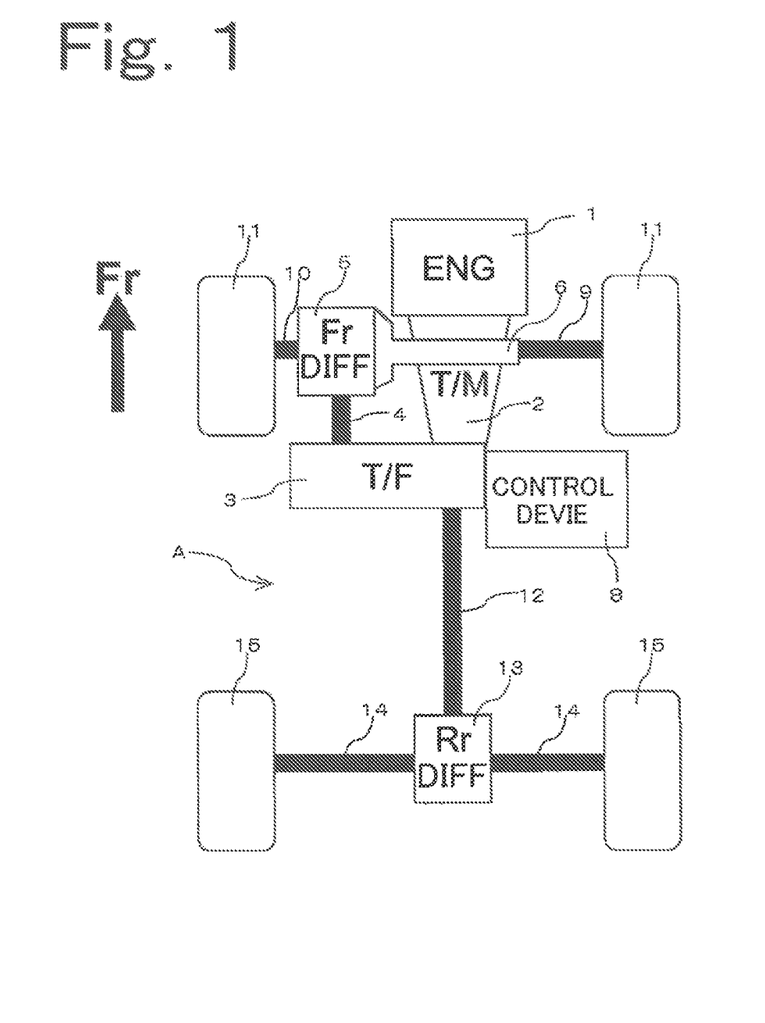
FIG. 1 is a structural view of the drive power connecting/disconnecting device of the invention applied to a vehicle.

As an embodiment of the invention, a drive power connecting/disconnecting device 6 applied to a vehicle A will be explained with reference to FIG. 1. The vehicle A in FIG. 1 includes an engine (ENG) 1 which is the power source, a transmission (T/M) 2, a transfer (T/F) 3, a front propeller shaft 4, a front differential mechanism (Fr Diff.) 5, the drive power connecting/disconnecting device 6, a control device 8, a right front drive shaft 9, a left front drive shaft 10, front wheels 11, a rear propeller shaft 12, a rear differential mechanism (Rr Diff.) 13, rear drive shafts 14 and rear wheels 15. When a drive power generated at an engine 1 is transmitted to the transfer 3 via the transmission 2, the drive power is distributed to the front propeller shaft 4 and the rear propeller shaft 12. The drive power distributed to the rear propeller shaft 12 is transmitted to the right and left wheels 15 via the rear differential mechanism 13 and the respective rear drive shafts 14.

On the other hand, the drive power distributed to the front propeller shaft 4 is transmitted to the front differential mechanism 5. According to the above structure, the driving mode of the vehicle is selected to a four-wheel drive by an operation of a driver or by the control device 8 depending on a running condition of the vehicle. In the four-wheel drive mode, when a coil 71 (See FIG. 2) of the drive power connecting/disconnecting device 6 is energized, through the energization of the coil 71, via the drive power connecting/disconnecting device 6, the front differential mechanism 5 (corresponding to the differential mechanism of the invention) and the right front drive shaft 9 (corresponding to the wheel axle of the invention) are connected. Thus, the drive power transmitted to the front differential mechanism 5 is distributed to the left front drive shaft 10 and the right front drive shaft 9 via the drive power connecting/disconnecting device 6 and finally transmitted to front the right and left wheels 11. Further, after the four-wheel drive mode has finished by the operation of the driver or by the control device 8 according to the running condition of the vehicle and when the two-wheel drive mode is selected thereafter, the energization of the coil 71 of the drive power connecting/disconnecting device 6 stops due to the de-energization and the drive power connecting/disconnecting device 6 and the front differential mechanism 5 are disconnected, i.e., the front differential mechanism 5 and the right front drive shaft 9 are disconnected.

Next, a structure of the invention will be explained hereinafter with reference to FIGS. 2 and 3.

Figure 2:
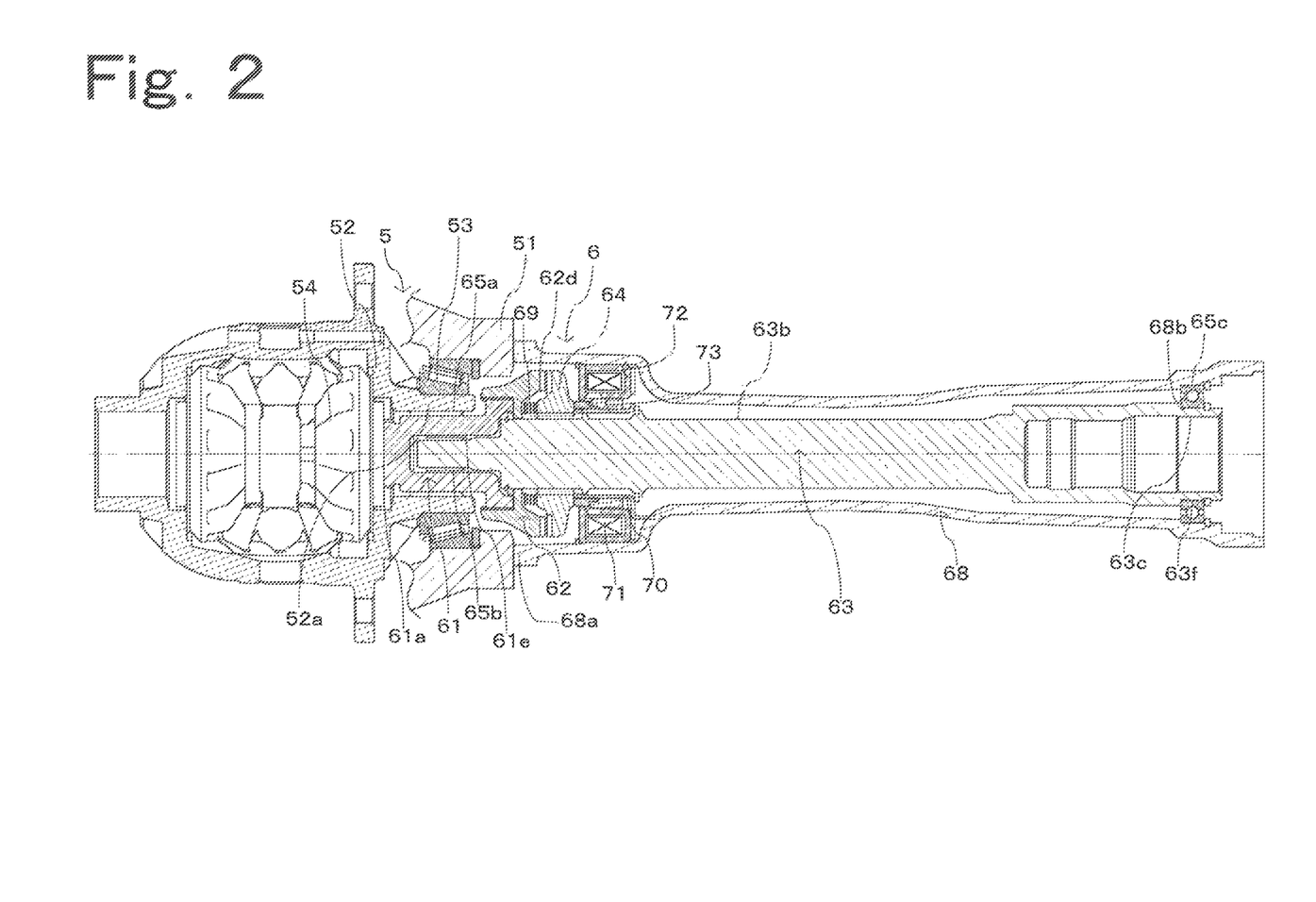
FIG. 2 is a cross-sectional view of the drive power connecting/disconnecting device shown in FIG. 1.

As shown in FIG. 2, the front differential mechanism 5 which distributes the drive power to the left front drive shaft 10 and the right front drive shaft 9 is housed in a differential housing 51. The differential housing 51 supports an outer periphery of a boss portion 52a of the differential case 52 which serves as an outer shell of the front differential mechanism 5 by means of a bearing 53. One of the side gears 54 accommodated in the differential case 52 is connected to a first shaft 61 which is formed in a cylindrical shape with a bottom surface.

Figure 3:
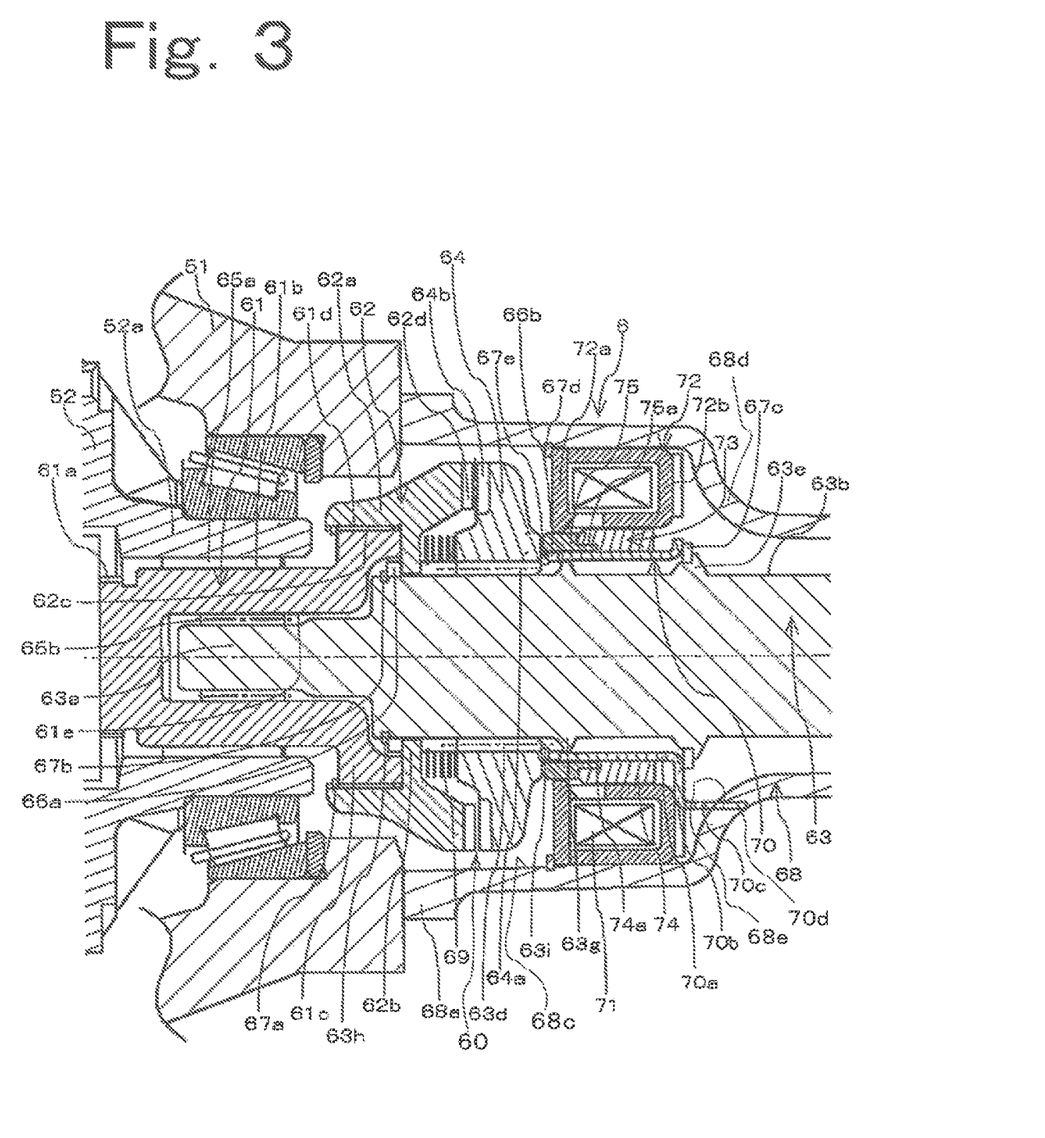
FIG. 3 is an enlarged main portion of the drive power connecting/disconnecting device shown in FIG. 2.

The first shaft 61 is, as shown in FIG. 3, includes a differential connecting portion 61a which is connected to an inner periphery of the side gear 54 (See FIG. 2), a main shaft portion 61b which is supported on an inner periphery of the boss portion 52a of the differential case 52 via a bearing 65a, a large diameter portion 61c on the outer periphery of which is provided with a spline 61d in an axial direction for supporting a main body portion 62a of a first rotational body 62 and a first pivotally supporting portion 61e which pivotally supports a second shaft 63, which will be explained later, in the cylindrical inner portion.

As shown in FIG. 3, the first rotational body 62 is formed in an annular shape and is formed by the main body portion 62a and a flange portion 62b provided projecting from the main body portion 62a towards the inner peripheral direction. The main body portion 62a is provided with a spline 62c which is in spline engagement with the spline 61d of the first shaft 61 along the inner peripheral portion in axial direction and is provided with a first dog tooth 62d at the end surface in the wheel axle direction (right direction in FIG. 3). The spline 62c of the first rotational body 62 is in spline engagement with the spline 61d of the first shaft 61 in a peripheral direction to be supported for unitary rotation with the first shaft 61. Further, the position of the first rotational body 62 is restricted in one axial direction by a detent member 67a which engages with the end surface at the main shaft portion 61b side of the large diameter portion 61c. Further, the one surface of the flange portion 62b at the first shaft 61 side is brought into contact with a spacer 66a provided adjacent to a detent member 67b fitted in a groove portion 63h provided at an outer periphery of a main shaft portion 63b of the second shaft 63 to thereby restrict the position of the first rotational body 62 in the other axial direction.

As shown in FIG. 3, the second shaft 63 is formed in a columnar shape and includes a tip end portion 63a which outer peripheral diameter is reduced, the main shaft portion 63b and a drive shaft connecting portion 63c (See FIG. 2). The main shaft portion 63b is provided on the outer peripheral portion thereof with a spline 63d which slidably supports a second rotational body 64 in the axial direction and a restricting portion 63e projecting in a radial direction. The drive shaft connecting portion 63c is provided on the outer peripheral portion thereof with a bearing portion 63f (See FIG. 2). The second shaft 63 is coaxially inserted into the first shaft 61 and the tip end portion 63a thereof is pivotally supported on the first shaft 61 at the first pivotally supporting portion 61e via a bearing 65b or allowing a relative rotation therewith and the bearing portion 63f is pivotally supported on a second pivotally supporting portion 68b (See FIG. 2) of the shaft cover 68 which will be explained later via a bearing 65c (See FIG. 2).

As shown in FIG. 3, the second rotational body 64 is formed in an annular shape and is provided on the inner peripheral portion thereof with a spline 64a which is in spline engagement with the spline 63d of the second shaft 63 along in axial direction and is provided on an end surface in axial direction with a second dog tooth 64b to be in spline engagement with the first dog tooth 62d of the first rotational body 62. The second rotational body 64 is supported on the second shaft 63 to be coaxially rotatable as a unit with the second shaft 63 and at the same time to be slidably movable in an axial direction relative to the second shaft 63 by the spline engagement between the spline 63d and the spline 64a in a peripheral direction. The first dog tooth 62d of the first rotational body 62 and the second dog tooth 64b of the second rotational body 64 are oppositely arranged with each other to form a dog clutch 60. Further, a return spring 69 (corresponding to a biasing member of the invention) biases the first rotational body 62 and the second rotational body 64 in a direction to be separating from each other. The return spring 69 is supported by the spline 63d of the second shaft 63.

As shown in FIG. 2, the shaft cover 68 is in a shape with a hollow inside and one end thereof is opened and enlarged in a bowl shape and is provided with a housing connecting portion 68a which is connected to the end surface of the differential housing 51 which accommodates the front differential mechanism 5 therein by means of a bolt or the like which is not shown in the drawings. As shown in FIG. 3, the housing connecting portion 68a is in a cylindrical shape and is provided with an inner wall 68c which extends along in the axial direction. Further, the other end of the shaft cover 68 is provided with the second pivotally supporting portion 68b which pivotally supports the bearing portion 63f of the second shaft 63 via the bearing 65c. The shaft cover 68 covers a portion from the drive shaft connecting portion 63c of the second shaft 63 to the first dog tooth 62d of the first rotational body 62 along in the axial direction and is to be connected to the differential housing 51 at the housing connecting portion 68a. In other words, the shaft cover 68 is used for covering at least the outer periphery of the second rotational body 64.

As shown in FIG. 3, the device which moves the second rotational body 64 in the axial direction is formed by an annular stationary element 72 in which the coil 71 is provided, an annular connecting/disconnecting member 73 which is movable along in the axial direction, a suction wall 72a which is formed integrally with the stationary element 72 and is configured to suction the connecting/disconnecting member 73 in the axial direction (leftward direction in FIG. 3) by the energization of the coil 71 upon conducting electricity through the coil 71 and a supporting member 70 formed by a non-magnetic material and supporting the connecting/disconnecting member 73. The stationary element 72, the connecting/disconnecting member 73 and the supporting member 70 are formed on the outer peripheral portion of the second shaft 63. It is noted that the fastening state between the dog tooth 62d and the dog tooth 64b of the dog clutch 60 can be easily held by the tooth flank friction resistance generated between the dog tooth 62d and the dog tooth 64b and the load to excite the coil 71 for holding the fastening can be reduced.

As shown in FIG. 3, the supporting member 70 is formed by an annularly shaped cylindrical portion 70a, a side wall portion 70b which extends outwardly in a radial direction from the cylindrical portion 70a and a rotation preventing portion 70c which extends towards the axial direction (rightward direction in FIG. 3) from the side wall portion 70b. The cylindrical portion 70a supports the inner periphery of the connecting/disconnecting member 73 and the side wall portion 70b is configured to be joined with an axial side surface 72b of the stationary element 72.

As shown in FIG. 3, the stationary element 72 which side surface 72b is joined to the side wall portion 70b of the supporting member 70 is arranged opposing to the outer periphery of the connecting/disconnecting member 73 in a radial direction and the outer periphery of the stationary element 72 is supported by the inner wall 68c of the housing connecting portion 68a. The second shaft 63 is configured to be penetrating through the inside of the cylindrical portion 70a of the supporting member 70.

Further, the rotation preventing portion 70c is brought into contact with a side wall 68d of the shaft cover 68 to thereby prevent the stationary element 72 from rotational displacement. In detail, the rotation preventing portion 70c includes an extended end 70d and the extended end 70d is inserted into an attachment bore 68e provided at the side wall 68d of the shaft cover 68 to have the extended end 70d being brought into contact with the attachment bore 68 in the peripheral direction to thereby prevent the supporting member 70 from rotation.

Further, the side wall portion 70b is brought into contact with a first engaging member 67c which is locked to the restricting portion 63e of the second shaft 63 in an axial direction and at the same time the suction wall 72a which is formed integrally with the stationary element 72 is brought into contact with a second engaging member 67d which is locked to the inner wall 68c of the housing connecting portion 68a in an axial direction to thereby restrict the axial position of the supporting member 70 and the stationary element 72. In other words, the stationary element 72 is provided to be in a position opposite to the outer periphery of the connecting/disconnecting member 73 in a radial direction. The second shaft 63 is provided with the first engaging member 67c which restricts the movement of the side wall portion 70b of the supporting member 70 in one axial direction (rightward direction in FIG. 3). The shaft cover 68 is provided with the second engaging member 67d which restricts the movement of the stationary element 72 in the other axial direction (leftward direction in FIG. 3). Thus, the axial position of the stationary element 72 is fixed by the first engaging member 67c under the state that the side surface 72b is in contact with the side wall portion 70b of the supporting member 70. Accordingly, the axial position of the supporting member 70 and the stationary element 72 can be restricted by the first engaging member 67c and the second engaging member 67d.

As shown in FIG. 3, the second shaft 63 is provided with a radially outwardly projecting annular end portion 63g provided separately from the similarly provided radially outwardly projecting annular restricting portion 63e. The restricting portion 63e and the end portion 63g form a pair of projecting portions. The cylindrical portion 70a of the supporting member 70 is supported on the second shaft 63 between the restricting portion 63e and the end portion 63g which form the pair of projecting portions. In more detail, one side (left side in FIG. 3) of the cylindrical portion 70a of the supporting member 70 is supported by the end portion 63g by radial contact therewith and the other side (right side in FIG. 3) of the cylindrical portion 70a, i.e., a portion bordering the side wall portion 70b is supported by the restricting portion 63e by an axial contact therewith and thus the cylindrical portion 70a is supported on the second shaft 63.

One end of the cylindrical portion 70a is configured to be brought into contact with a spacer 66b provided on the end portion 63g of the spline 63d of the second shaft 63 to act against the biasing force of the return spring 69 which forces the second rotational body 64 to be separated from the first rotational body 62 via an engaging member 67e fitted in a groove portion 63i provided on the outer periphery of the end portion 63g and positioned adjacent to the spacer 66b.

As shown in FIG. 3, the connecting/disconnecting member 73 includes an annular shape movable element 74 which is a magnetic material body and a collar member 75 which is a non-magnetic material body. The movable element 74 is provided with a recessed portion 74a, while the collar member 75 is provided with a projection 75a which is configured to be engaged with the recessed portion 74a of the movable element 74. The collar member 75 is formed such that the projection 75a is press-fitted in the recessed portion 74a of the movable element 74 to be able to move in an axial direction together with the movable element 74 as a unit. The inner periphery of the connecting/disconnecting member 73 is supported by the cylindrical portion 70a of the supporting member 70 to be able to rotate relative to the cylindrical portion 70a and to be able to slidably move in an axial direction. Further, the connecting/disconnecting member 73 is arranged to oppose to the stationary element 72 in a radial direction without being in contact with the inner periphery thereof. The axial movement of the connecting/disconnecting member 73 is restricted by the side wall portion 70b.

Figure 6:
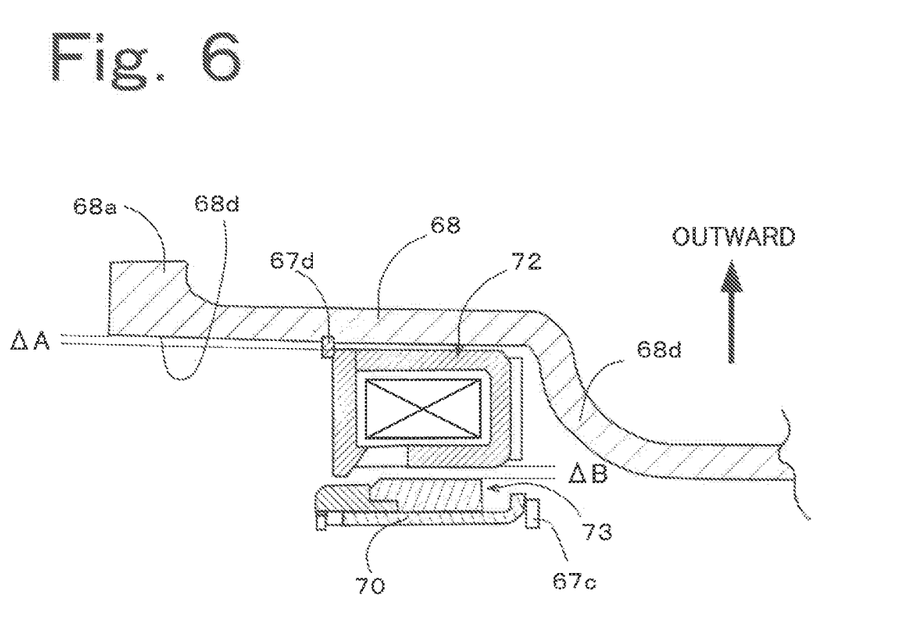
FIG. 6 is an explanatory view explaining the positional relationship between the shaft cover and the connecting/disconnecting member.

As shown in FIG. 6, it is noted that the difference between the inner diameter of the housing connecting portion 68a of the shaft cover 68 and the outer diameter of the stationary element 72 is defined to be ΔA and the difference between the inner diameter of the stationary element 72 and the outer diameter of the connecting/disconnecting member 73 is defined to be ΔB, the relation "ΔA<ΔB" is always established and the clearance ΔB exists between the inner periphery of the stationary element 72 and the outer diameter of the connecting/disconnecting member 73. By this clearance ΔB, no load derived from the positional deviation of the stationary element 72 is applied on the connecting/disconnecting member 73, which can reduce the sliding resistance in an axial direction applied on the connecting/disconnecting member 73 and such axial movement of the connecting/disconnecting member 73 can be performed smoothly. It is noted here that FIG. 6 shows only portions necessary for explanation and other portions are omitted. The direction of arrow in FIG. 6 indicates the outward direction.

It is noted that instead of structuring the relative rotatable co-axial supporting of the first shaft 61 and the second shaft 63 shown in the embodiment, the structure that the first shaft 61 is provided with a tip end portion having a small diameter and the second shaft 63 is provided with a bearing portion having cylindrical shape with a bottom, wherein the tip end portion of the first shaft is pivotally supported at the bearing portion of the second shaft 63 via the sliding member (such as bearings or the like) can be applicable.

Further, instead of the structure that the first shaft 61 and the second shaft 63 are connected using the first dog tooth 62d provided at the first rotational body 62 shown in the above embodiment, it may be possible to connect the first shaft 61 and the second shaft 63 using the first spline provided at the outer periphery of one of the first shaft 61 and the first rotational body 62 and the second spline provided at the second rotational body 64 used as the second dog tooth 64b for spline engagement with the first spline.

Next, the operation of the embodiment of the invention will be explained with reference to FIGS. 4 and 5.

Figure 4:
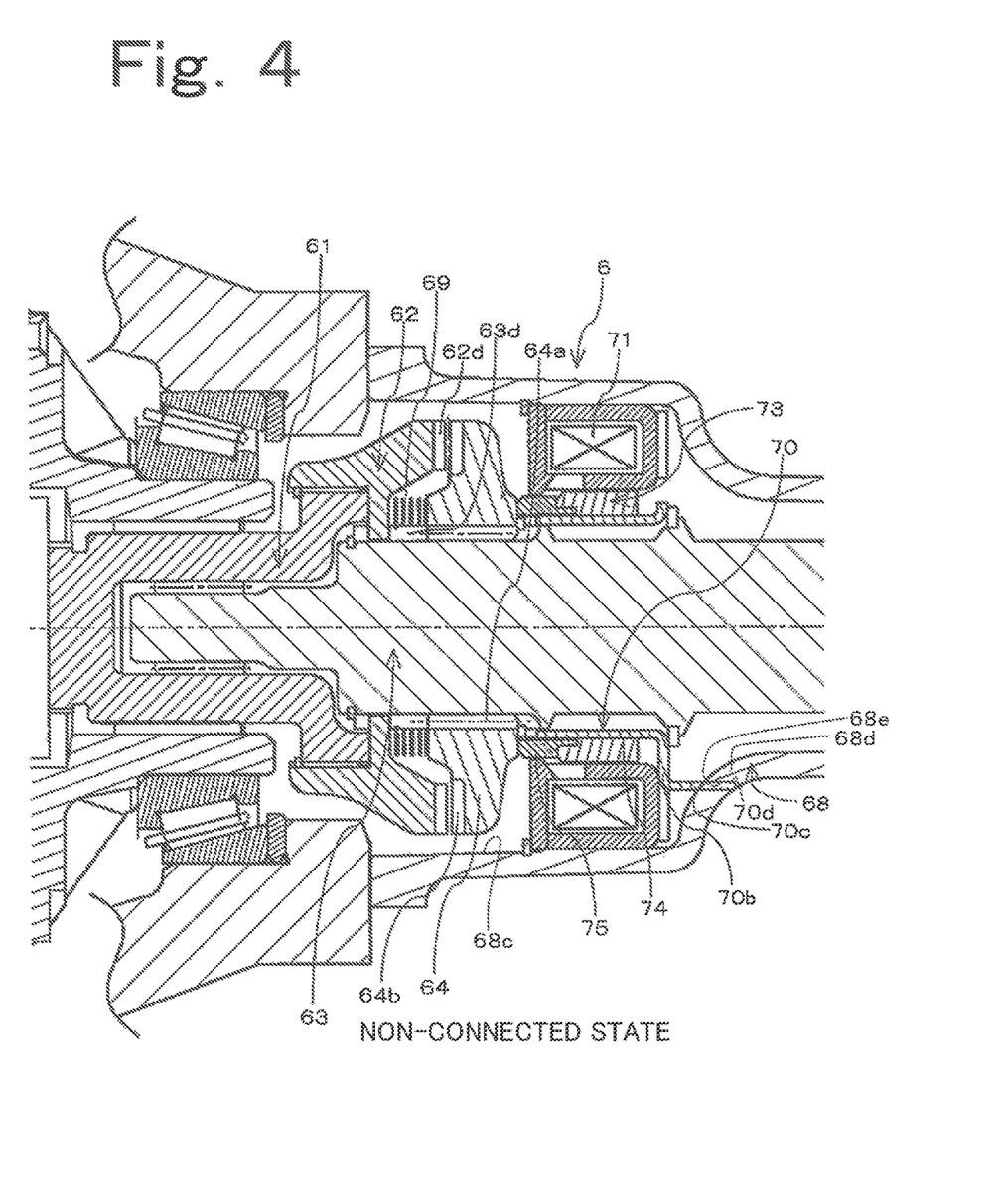
FIG. 4 is an explanatory view of the drive power connecting/disconnecting device under a non-connected state.

FIG. 4 indicates the non-connected state of the first shaft 61 and the second shaft 63. Since the first dog tooth 62d of the first rotational body 62 is not engaged with the second dog tooth 64b of the second rotational body 64, the first shaft 61 and the second shaft 63 are not connected with each other (in a mutually disconnected state). Further, the spline 63d of the second shaft 63 and the spline 64a of the second rotational body 64 are spline-engaged with each other in a peripheral direction to allow a unitary rotation of the second shaft 63 and the second rotational body 64. Under this state, the coil 71 is not excited and therefore, the coil 71 is under a non-energized state. The second rotational body 64 is biased in the right direction as viewed in FIG. 4 by the biasing force of the return spring 69 under the coil 71 being in a non-energized state to be brought into contact with the collar member 75. Thus, the connecting/disconnecting member 73 is biased in the axial direction (rightward direction in FIG. 4). It is noted that the movement of the movable element 74 of the connecting/disconnecting member 73 in the axial direction (rightward direction in FIG. 4) is restricted by the contact of the movable element 74 with the side wall portion 70b of the supporting member 70. The side wall portion 70b serves as a stopper to restrict the movement of the movable element 74.

The connecting/disconnecting member 73 behaves to co-rotate with the rotation of the second rotational body 64 by the contact with the second rotational body 64. Then, the supporting member 70 and the stationary element 72 which is formed integrally with the supporting member 70 try to co-rotate with the connecting/disconnecting member 73, but the rotation preventing portion 70c formed on the supporting member 70 is brought into contact with the side wall 68d of the shaft cover 68 in a peripheral direction to prevent the co-rotation of the supporting member 70 and the stationary element 72.

Figure 5:
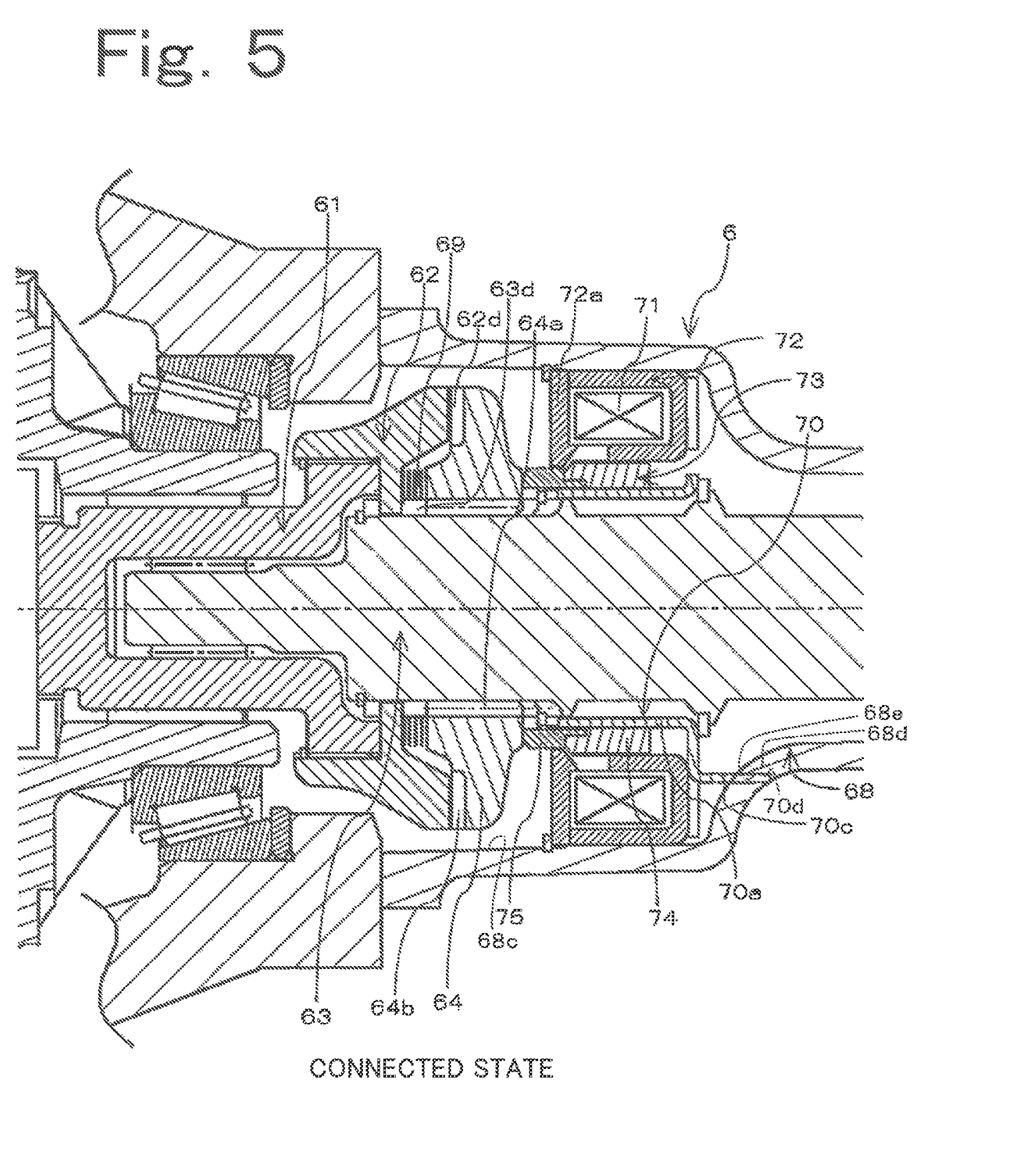
FIG. 5 is an explanatory view of the drive power connecting/disconnecting device under a connected state.

To the state of FIG. 4, FIG. 5 indicates the connected state of the first shaft 61 and the second shaft 63 and under this state, the drive power can be transmittable. For example, when the vehicle driving mode is switched over to the four-wheel drive mode by the switching manipulation of the driver of the vehicle, or by the control of the control device 8 (See FIG. 1) based on the running state of the vehicle, the coil 71 is excited and by the energization of the coil 71, the stationary element 72 including a suction wall 72*a* and the movable element 74 of the connecting/disconnecting member 73 are energized and the movable element 74 is suctioned towards the suction wall 72*a* in an axial direction and the collar member 75 is pushed outward like a plunger. Thus, the collar member 75 is brought into contact with the second rotational body 64 to move the second rotational body 64 towards the first rotational body 62 side overcoming the biasing force of the return spring 69. When the tip end of the movable element 74 is brought into contact with the suction wall 72*a*, the axial movement of the second rotational body 64 is restricted thereby.

Under such state, the first dog tooth 62*d* of the first rotational body 62 and the second dog tooth 64*b* of the second rotational body 64 are engaged with each other and at the same time the spline 63*d* of the second shaft 63 and the spline 64*a* of the second rotational body 64 are in spline engagement in the peripheral direction. Accordingly, the first shaft 61 and the second shaft 63 are connected to be able to transmit the drive power. It is noted that similar to the non-connected state, the rotation preventing portion 70*c* of the supporting member 70 is brought into contact with the side wall 68*d* of the shaft cover 68 in the periphery direction to prevent a co-rotation of the supporting member 70 and the stationary element 72.

When the vehicle driving mode is switched over to the two-wheel drive mode by the switching manipulation of the driver of the vehicle, or by the judgement of the control device 8 to terminate the four-wheel drive based on the running state of the vehicle, the excitation of the coil 71 is terminated and by this de-energization of the coil 71, the connecting/disconnecting member 73 is returned to the state shown in FIG. 4, which is the state that the first rotational body 62 and the second rotational body 64 are separated from each other by the biasing force of the return spring 69.

It is noted here that, instead of using the structure of connecting and disconnecting the first shaft 61 and the second shaft 63 shown in the above embodiment, it may be possible to use the structure wherein the second rotational body 64 is moved towards the first rotational body 62 by the biasing force of the return spring 69 to engage the first dog tooth 62*d* with the second dog tooth 64*b* thereby connecting the first shaft 61 and the second shaft 63. It is further noted that it may also be possible to use the structure wherein by the excitation of the coil 71, the second rotational body 64 is moved in the axial direction, overcoming the biasing force of the return spring 69 to disconnect the first shaft 61 and the second shaft 63.

As explained above, the drive power connecting/disconnecting device 6 according to the embodiment of the invention includes the differential housing 51 which accommodates therein the differential mechanism 5, the first shaft 61 supported on the boss portion 52*a* of the differential mechanism 5 and rotating the first rotational body 62 which transmits the drive power distributed at the differential mechanism 5, the second shaft 63 provided coaxially with the first shaft 61 and transmitting the drive power to the wheel axle 9 transmitted from the first rotational body 62 by the second rotational body 64 which is positioned opposing to the first rotational body 62, the connecting/disconnecting member 73 axially movably provided on the outer periphery of the second shaft 63 and moving the second rotational body 64 in the axial direction relative to the first rotational body 62 to thereby connect or disconnect the first shaft 61 and the second shaft 63, the supporting member 70 provided on the outer periphery of the second shaft 63 and supporting the connecting/disconnecting member 73 to be movable along in the axial direction, the stationary element 72 provided on the outer periphery of the second shaft 63 and moving the connecting/disconnecting member 73 along in the axial direction by energization of the coil 71, the shaft cover 68 which covers at least the outer periphery of the second rotational body 64 and connected to the differential housing 51, the first pivotally supporting portion 61*e* provided between the first shaft 61 and the second shaft 63 and pivotally supporting one end of the second shaft 63 and the second pivotally supporting portion 68*b* provided inside of the shaft cover 68 and pivotally supporting the other end of the second shaft 63.

According to the feature above, the first shaft 61 is pivotally supported on the boss portion 52*a* of the differential mechanism 5. The first pivotally supporting portion 61*e* is provided between the first shaft 61 and the second shaft 63 to pivotally support one end of the second shaft 63 and the other end of the second shaft 63 is pivotally supported by the second pivotally supporting portion 68*b* provided inside of the shaft cover 68. Since the stationary element 72, the connecting/disconnecting member 73 and the supporting member 70 are provided on the outer periphery of the second shaft 63, the first rotational body 62, the second rotational body 64, the second shaft, 63 the connecting/disconnecting member 73, the supporting member 70 and the stationary element 72 can be accommodated in the shaft cover 68. In other words, by placing the drive power connecting/disconnecting device 6 in the shaft cover 68, the shape of the differential housing 51 is not necessarily changed depending on the type with or without drive power connecting/disconnecting device 6. Further, the clutch shaft and the clutch housing which covers the clutch shaft, which have been necessary for the conventional drive power connecting/disconnecting device, are no more necessary and the drive power connecting/disconnecting device 6 which number of components is reduced, can be realized.

As explained above, the drive power connecting/disconnecting device 6 according to the embodiment of the invention is provided with the biasing member 69 which is disposed between the first rotational body 62 and the second rotational body 64 for biasing the connecting/disconnecting member 73 to move in the direction that the first rotational body 62 and the second rotational body 64 are separated from each other when the coil 71 is in the non-energized state. Thus, when the exciting of the coil 71 stops and the coil 71 becomes the non-energized state, the stationary element 72 and the connecting/disconnecting member 73 are accordingly de-energized and the second rotational body 64 is mechanically moved by the biasing force of the biasing member 69 to be separated from the first rotational body 62. Thus, the electric excitement control during the drive power disconnecting operation becomes unnecessary.

As explained above, according to the drive power connecting/disconnecting device 6 of the embodiment of the invention, the first rotational body 62 and the second rotational body 64 form the dog clutch 60. Due to the sliding resistance generated between the tooth flanks of the dog tooth 62*d* and the dog tooth 64*b*, the fastening state between the first rotational body 62 and the second rotational body 64 can be easily held and electric current amount to excite the coil 71 for maintaining the fastening state can be reduced.

As explained above, according to the drive power connecting/disconnecting device 6 of the embodiment of the invention, the stationary element 72 is supported by the inner wall 68c of the shaft cover 68 and the clearance ΔB between the stationary element 72 and the connecting/disconnecting member 73 in the radial direction is provided. Accordingly, the connecting/disconnecting member 73 is not influenced by the load caused by the positional deviation of the stationary element 72 relative to the connecting/disconnecting member 73. Therefore, the sliding resistance in the axial direction influencing on the connecting/disconnecting member 73 can be reduced and the axial movement of the connecting/disconnecting member 73 can be smoothly performed.

As explained above, according to the drive power connecting/disconnecting device 6 of the embodiment of the invention, the supporting member 70 includes the cylindrical portion 70a which supports the connecting/disconnecting member 73 and the side wall portion 70b which extends from the cylindrical portion 70a radially outward. The side wall portion 70b restricts the movement of the connecting/disconnecting member 73 towards the side wall portion 70b side. This can prevent the connecting/disconnecting member 73 from dropping off from the supporting member 70.

As explained above, according to the drive power connecting/disconnecting device 6 of the embodiment of the invention, the stationary element 72 is provided opposite to the outer periphery of the connecting/disconnecting member 73 in the radial direction, the second shaft 63 is provided with the first engaging member 67c which restricts a movement of the side wall portion 70b in one axial direction and the shaft cover 68 is provided with the second engaging member 67d which restricts the movement of the stationary element 72 in the other axial direction, wherein the axial position of the stationary element 72 is determined by the first engaging member 67c under a state that the stationary element 72 is in contact with the side wall portion 70b of the supporting member 70. Thus, the respective axial positions of the supporting member 70 and the stationary element 72 are both restricted and the relative axial positional deviation between the stationary element 72 and the connecting/disconnecting member 73 can be minimized. Thus, shortening of axial length of the stationary element 72 can be realized.

As explained above, according to the drive power connecting/disconnecting device 6 of the embodiment of the invention, the supporting member 70 is provided with the rotation preventing portion 70c which extends from the side wall portion 70b and the rotational displacement caused by the contact between the rotation preventing portion 70c and the side wall 68d of the shaft cover 68 can be suppressed. This can prevent the co-rotation of the supporting member 70 in association with the rotation of the connecting/disconnecting member 73 and a frictional abrasion caused by the frictional sliding movement between the outer periphery of the stationary element 72 and the inner wall 68c of the shaft cover 68 can be suppressible.

As explained, according to the drive power connecting/disconnecting device 6 of the above embodiment of the invention, the rotation preventing portion 70c includes an extended end 70d which is inserted into the attachment bore 68e formed at the side wall 68d of the shaft cover 68 to prevent the supporting member 70 from rotation. The attachment of the rotation preventing portion 70c to the device can be easily made by this structure.

As explained above, according to the drive power connecting/disconnecting device 6 of the above embodiment of the invention, the connecting/disconnecting member 73 is provided with the movable element 74 formed by the magnetic body and a collar member 75 formed by the non-magnetic body and wherein the collar member 75 pushes the second rotational body 64 in one axial direction by the contact with the second rotational body 64. Therefore, the material of the connecting/disconnecting member 73 is not limited to the magnetic material and the collar member 75 can be formed by the non-magnetic material and the freedom of material choice can be widened.

As explained, according to the drive power connecting/disconnecting device 6 of the above embodiment of the invention, the cylindrical portion 70a of the supporting member 70 is supported by the pair of projections provided axially separately and extending radially outward from the second shaft 63. Thus, the reduction of weight of the second shaft 63 at a portion between the pair of projections can be achieved.

The present invention is not limited to the embodiment explained above and numerous modifications and variations of the present invention are possible in light of the above teachings. For example, not only a vehicle, it is possible to apply to various kinds of devices and machines that connecting or disconnecting of power transmission is necessary

EXPLANATION OF NUMERALS OR SYMBOLS

5: front differential mechanism (differential mechanism),
6: drive power connecting/disconnecting device,
9: right front drive shaft (wheel axle),
51: differential housing,
52: differential case,
53: bearing,
54: side gear
60: dog clutch,
61: first shaft,
61e: first pivotally supporting portion,
62: first rotational body,
62d: first dog tooth,
63: second shaft,
63a: tip end portion,
63b: main shaft portion,
63f: bearing portion,
64: second rotational body,
64b: second dog tooth,
65a: bearing,
67c: first engaging member,
67d: second engaging member,
68: shaft cover,
68a: housing connecting portion,
68b: second pivotally supporting portion,
68c: inner wall,
68d: side wall,
68e: attachment bore,
69: return spring (biasing member),
70: supporting member,
70a: cylindrical portion,
70b: side wall portion,
70c: rotation preventing portion,
70d: extended end
71: coil,
72: stationary element,
72a: suction wall,
72b: side surface,
73: connecting/disconnecting member,
74: movable element, and
75: collar member.

What we claim is:

1. A drive power connecting/disconnecting device comprising:
a differential housing which accommodates therein a differential mechanism;
a first shaft supported on a boss portion of the differential mechanism and rotating a first rotational body which transmits a drive power distributed at the differential mechanism;
a second shaft provided coaxially with the first shaft and transmitting the drive power to a wheel axle transmitted from the first rotational body by a second rotational body which is positioned opposing to the first rotational body;
a connecting/disconnecting member provided axially movably on an outer periphery of the second shaft and moving the second rotational body in an axial direction relative to the first rotational body to thereby connect or disconnect the first shaft and the second shaft,
a supporting member provided on the outer periphery of the second shaft and supporting the connecting/disconnecting member to be movable along in the axial direction;
a stationary element provided on the outer periphery of the second shaft such that the stationary element is arranged opposed to the outer periphery of the connecting/disconnecting member in a radial direction and moving the connecting/disconnecting member along in the axial direction by energization of a coil;
a shaft cover covering at least an outer periphery of the second rotational body and connected to the differential housing;
a first pivotally supporting portion provided between the first shaft and the second shaft and pivotally supporting one end of the second shaft; and
a second pivotally supporting portion provided inside of the shaft cover and pivotally supporting another end of the second shaft, wherein
the stationary element is supported by an inner wall of the shaft cover and a clearance between the stationary element and the connecting/disconnecting member in the radial direction is provided.

2. The drive power connecting/disconnecting device according to claim 1, further comprising:
a biasing member which is disposed between the first rotational body and the second rotational body for biasing the connecting/disconnecting member to move in a direction that the first rotational body and the second rotational body are separated from each other, when the coil is in a non-energized state.

3. The drive power connecting/disconnecting device according to claim 1, wherein
the first rotational body and the second rotational body form a dog clutch.

4. The drive power connecting/disconnecting device according to claim 1, wherein
the clearance between the stationary element and the connecting/disconnecting member in the radial direction is greater than a difference between an inner diameter of the housing connecting portion of the shaft cover and an outer diameter of the stationary element.

5. The drive power connecting/disconnecting device according to claim 1, wherein
the supporting member includes a cylindrical portion which supports the connecting/disconnecting member and a side wall portion which extends from the cylindrical portion radially outward to restrict a movement of the connecting/disconnecting member towards the side wall portion side.

6. The drive power connecting/disconnecting device according to claim 5, wherein
the stationary element is provided opposite to an outer periphery of the connecting/disconnecting member in the radial direction;
the second shaft is provided with a first engaging member which restricts a movement of the side wall portion in one axial direction;
the shaft cover is provided with a second engaging member which restricts the movement of the stationary element in another axial direction; and wherein
a position of the stationary element in the axial direction is determined by the first engaging member under a state that the stationary element is in contact with the side wall portion of the supporting member.

7. The drive power connecting/disconnecting device according to claim 6, wherein
the supporting member is provided with a rotation preventing portion which extends from the side wall portion and a rotational displacement caused by the contact between the rotation preventing portion and a side wall of the shaft cover is suppressed.

8. The drive power connecting/disconnecting device according to claim 7, wherein
the rotation preventing portion includes an extended end which is configured to be inserted into an attachment bore formed at the side wall of the shaft cover to prevent the supporting member from rotation.

9. The drive power connecting/disconnecting device according to claim 1, wherein
the connecting/disconnecting member is provided with a movable element formed by a magnetic body and a collar member formed by a non-magnetic body and wherein,
the collar member pushes the second rotational body in one axial direction by contacting with the second rotational body.

10. The drive power connecting/disconnecting device according to claim 1, wherein
a cylindrical portion of the supporting member is supported by a pair of projections provided axially separately and extending radially outward from the second shaft.

* * * * *